Figure 25:
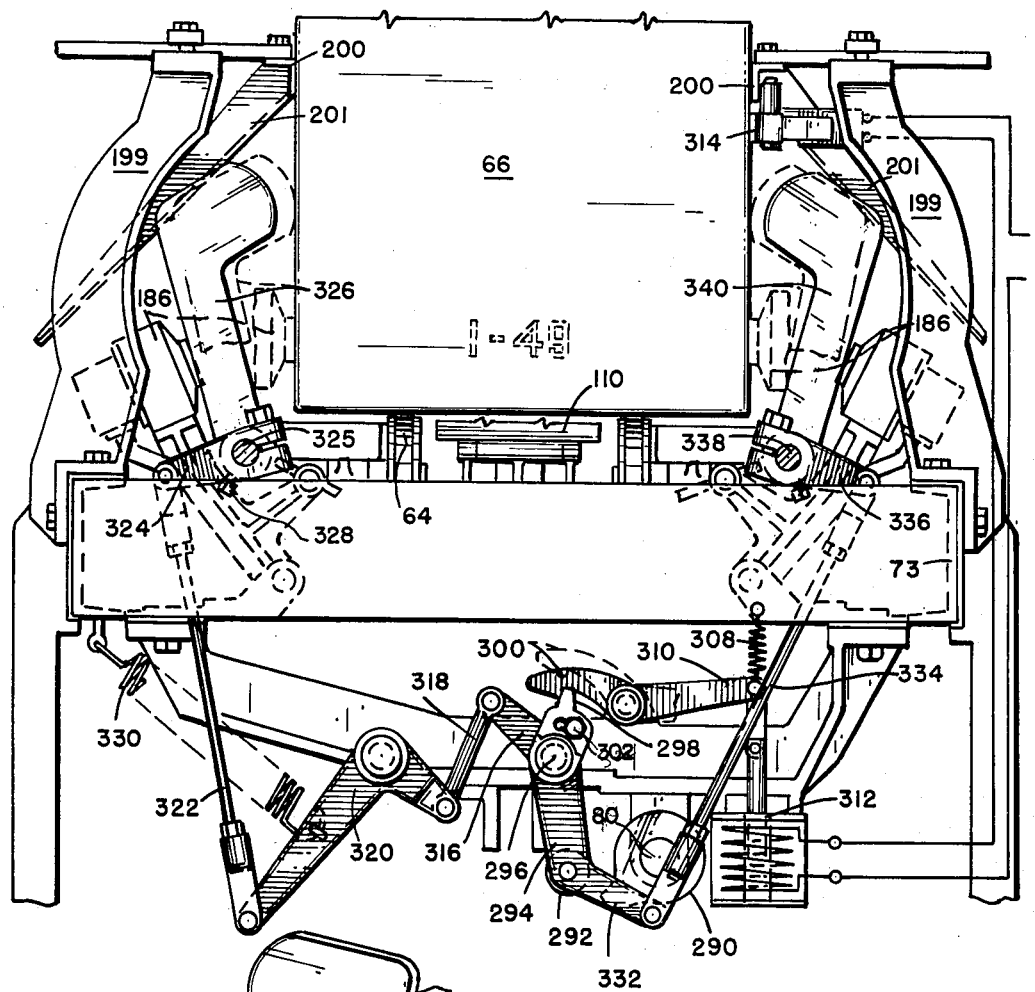

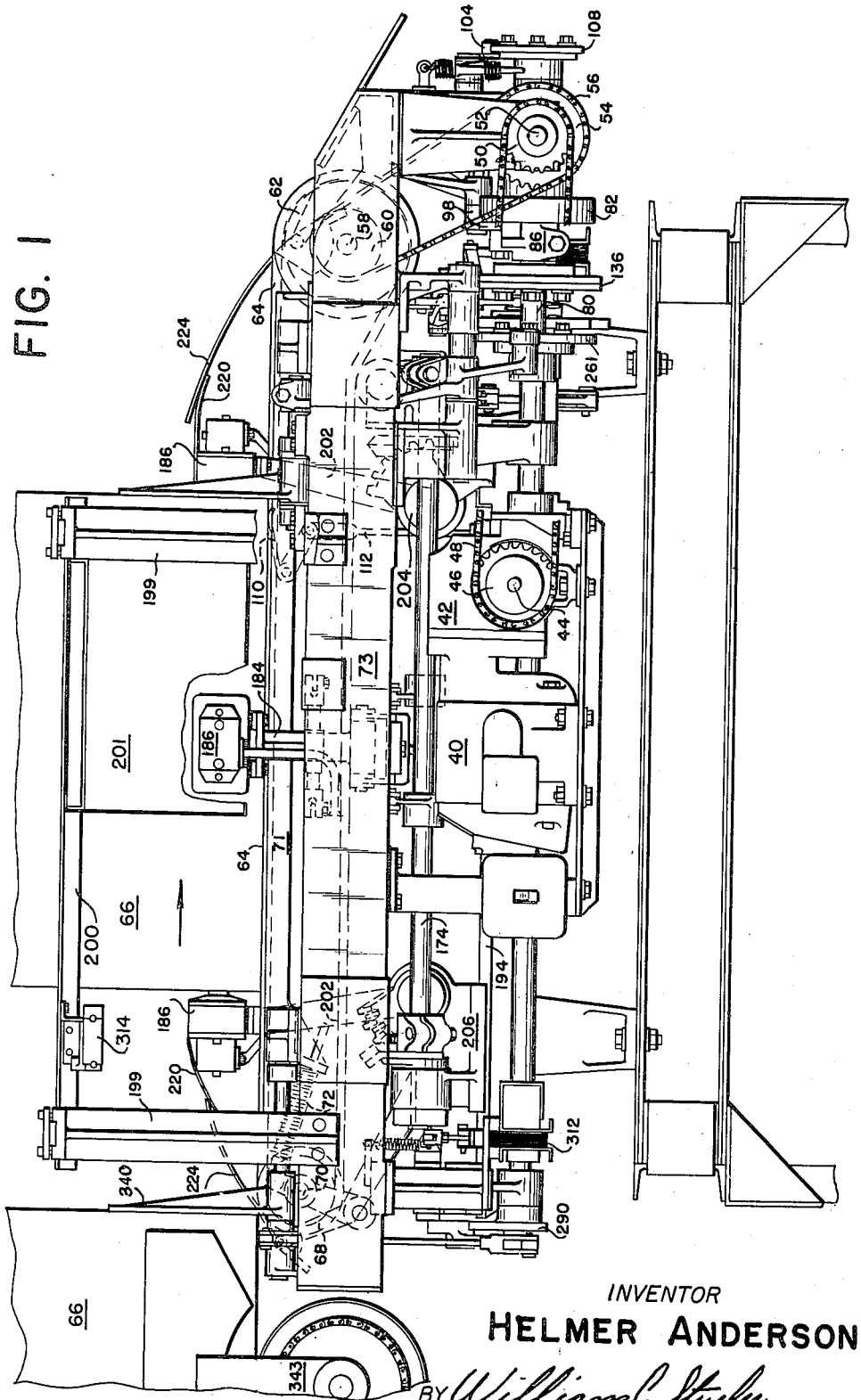

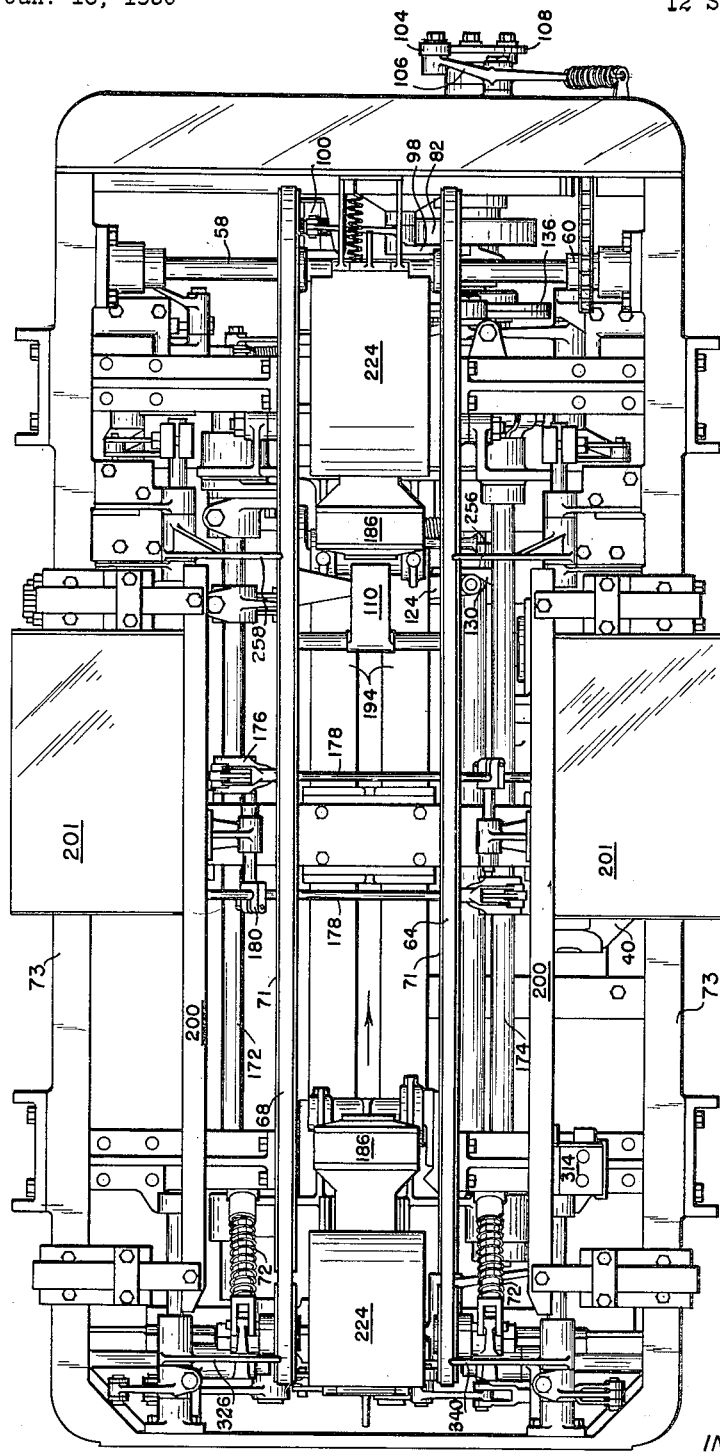

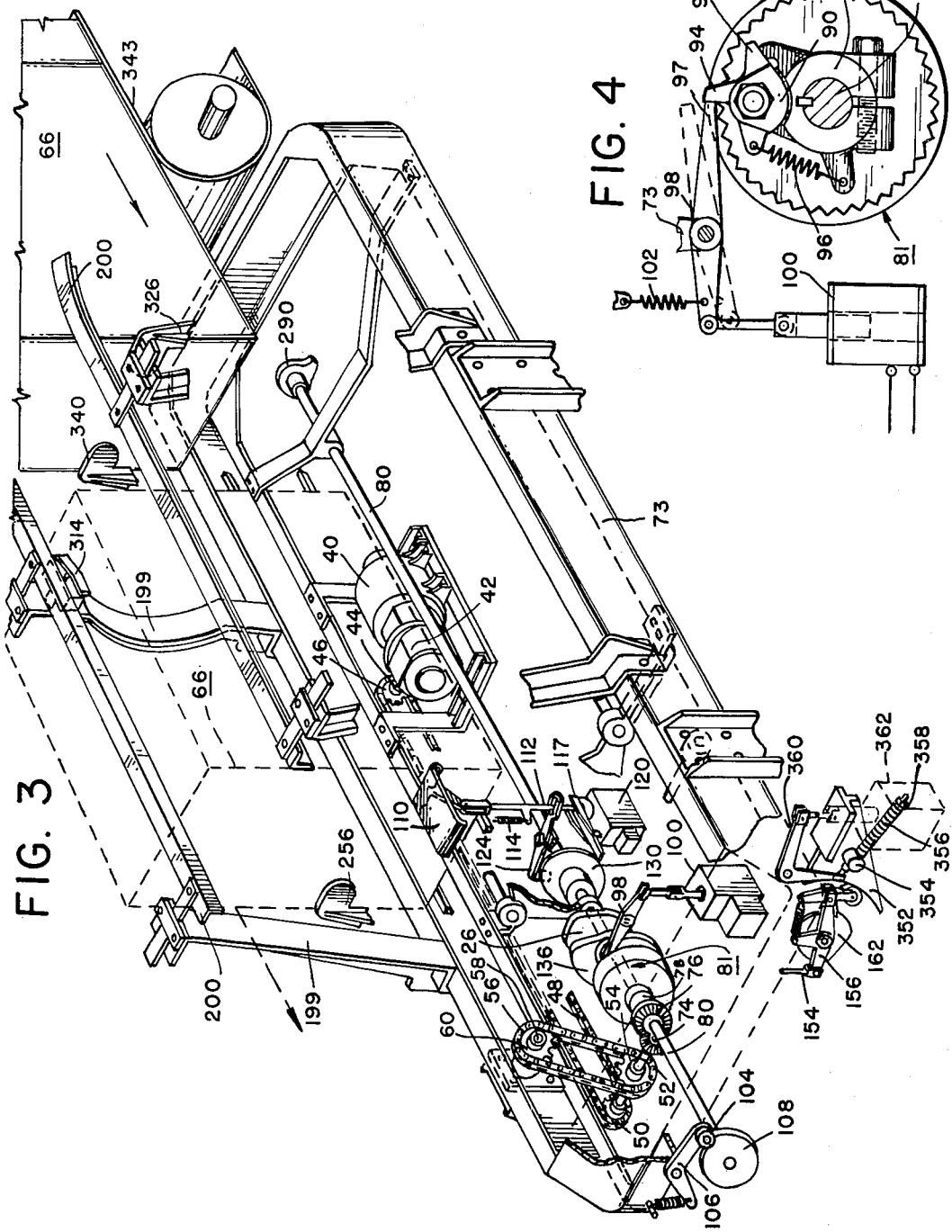

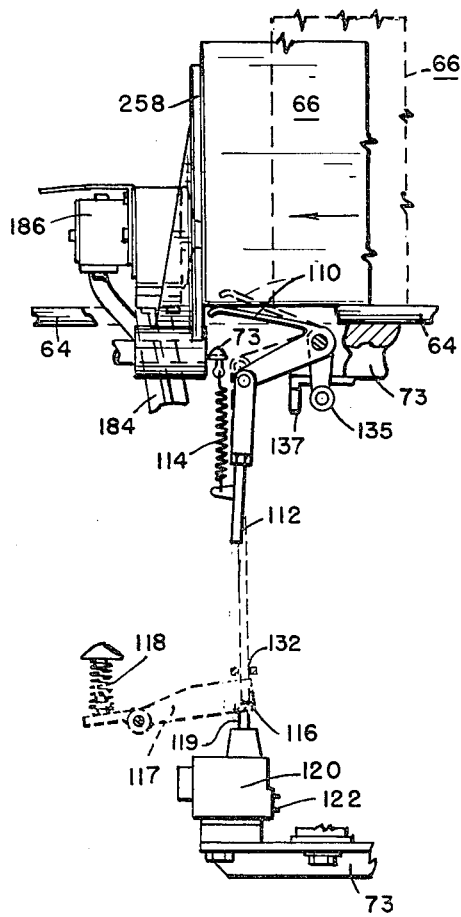
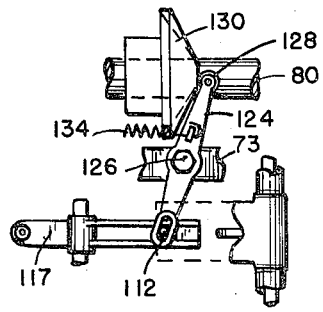
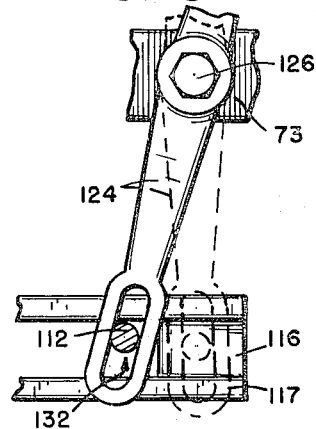
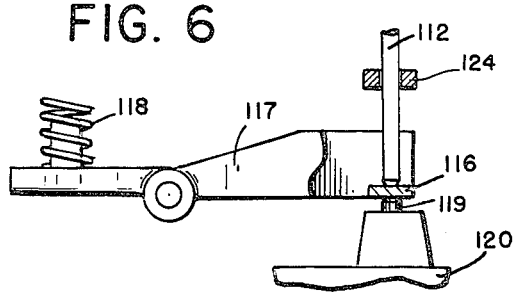
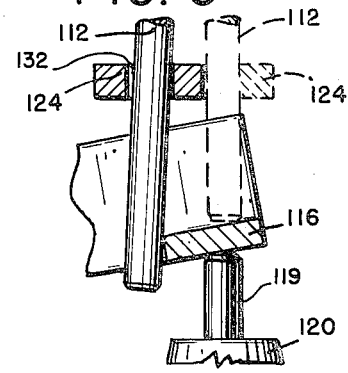

April 3, 1956
H. ANDERSON
2,740,351
BOX MARKING MACHINE
Filed Jan. 16, 1950
12 Sheets-Sheet 5
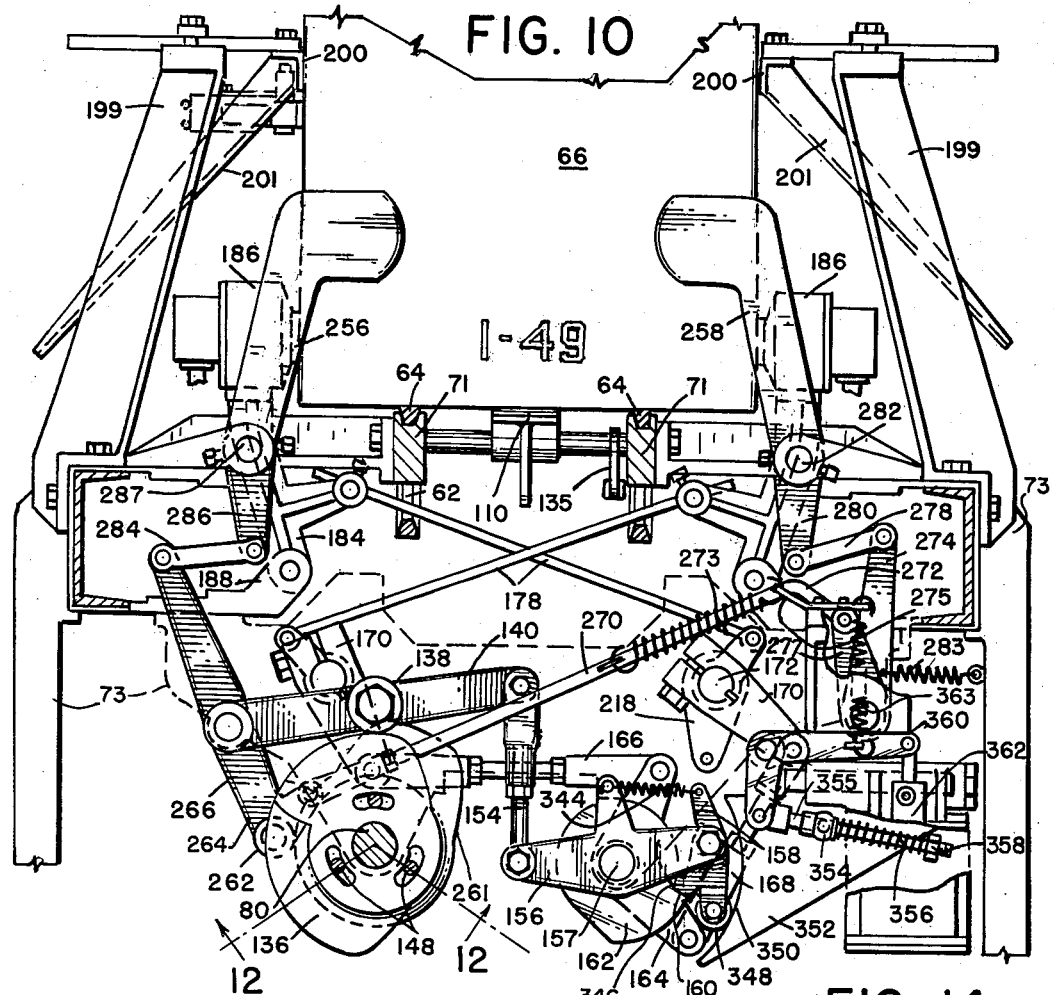
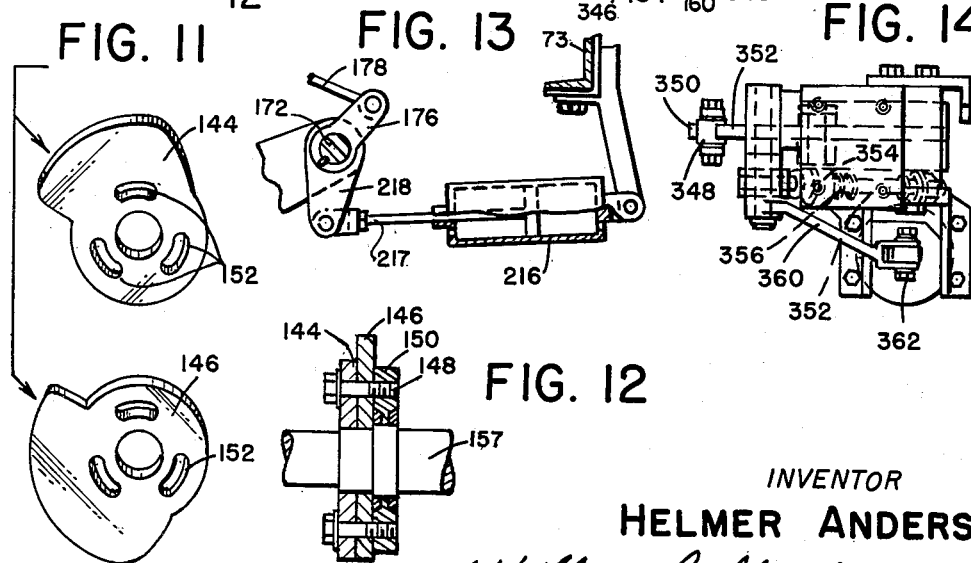
INVENTOR
HELMER ANDERSON
BY William C. Stueber
ATTORNEY April 3, 1956
H. ANDERSON
2,740,351
BOX MARKING MACHINE
Filed Jan. 16, 1950
12 Sheets-Sheet 6
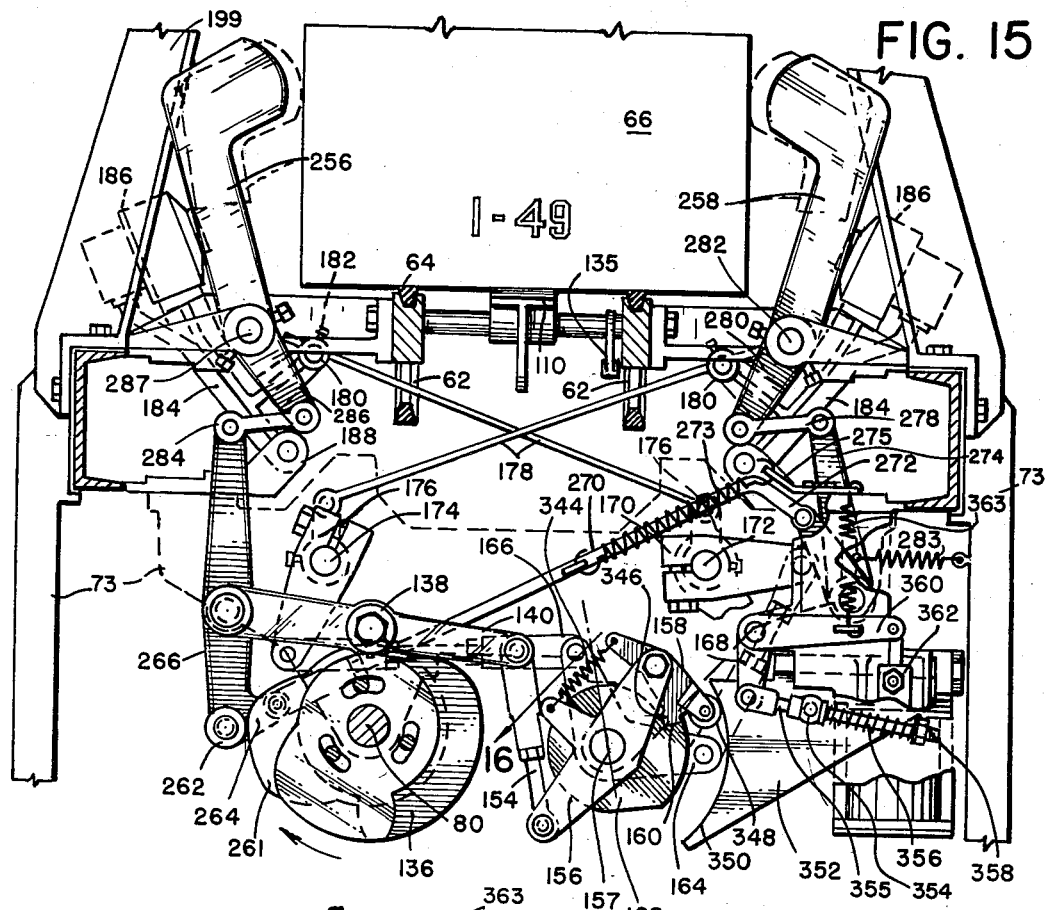
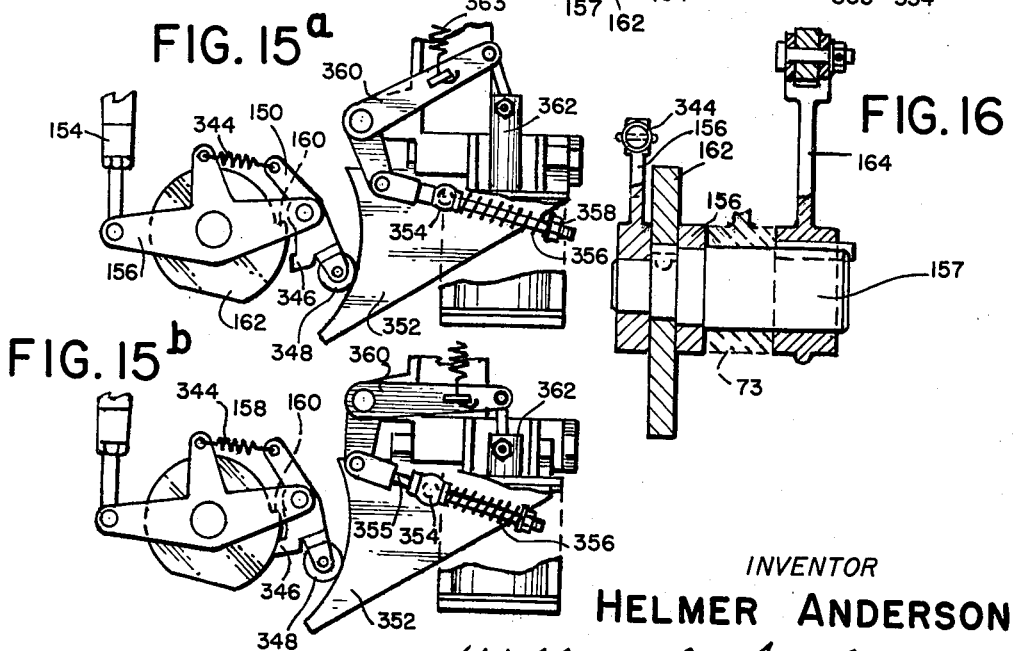
INVENTOR
HELMER ANDERSON
BY William C. Strueber ATTORNEY

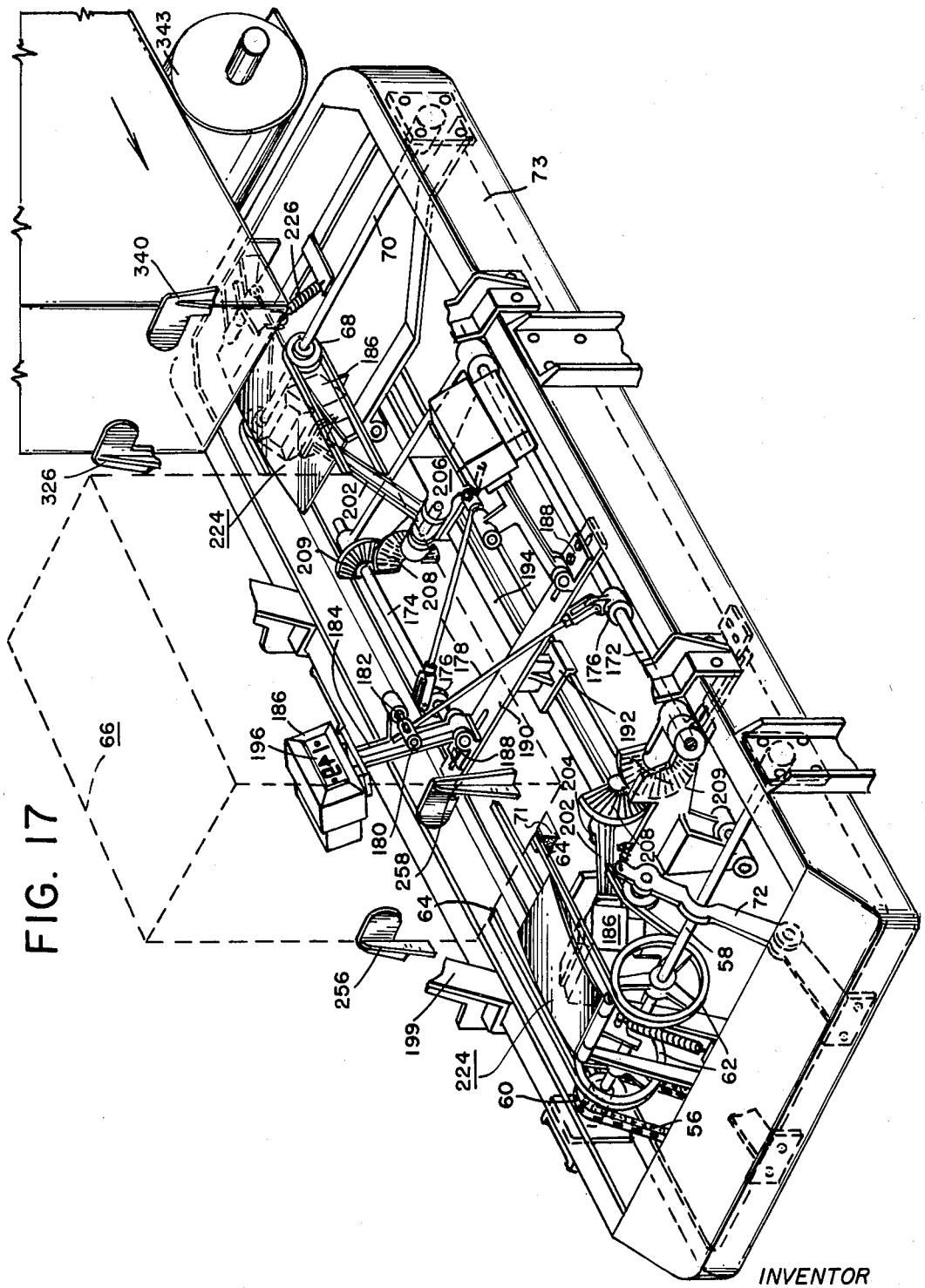

April 3, 1956     H. ANDERSON     2,740,351
BOX MARKING MACHINE
Filed Jan. 16, 1950     12 Sheets-Sheet 8
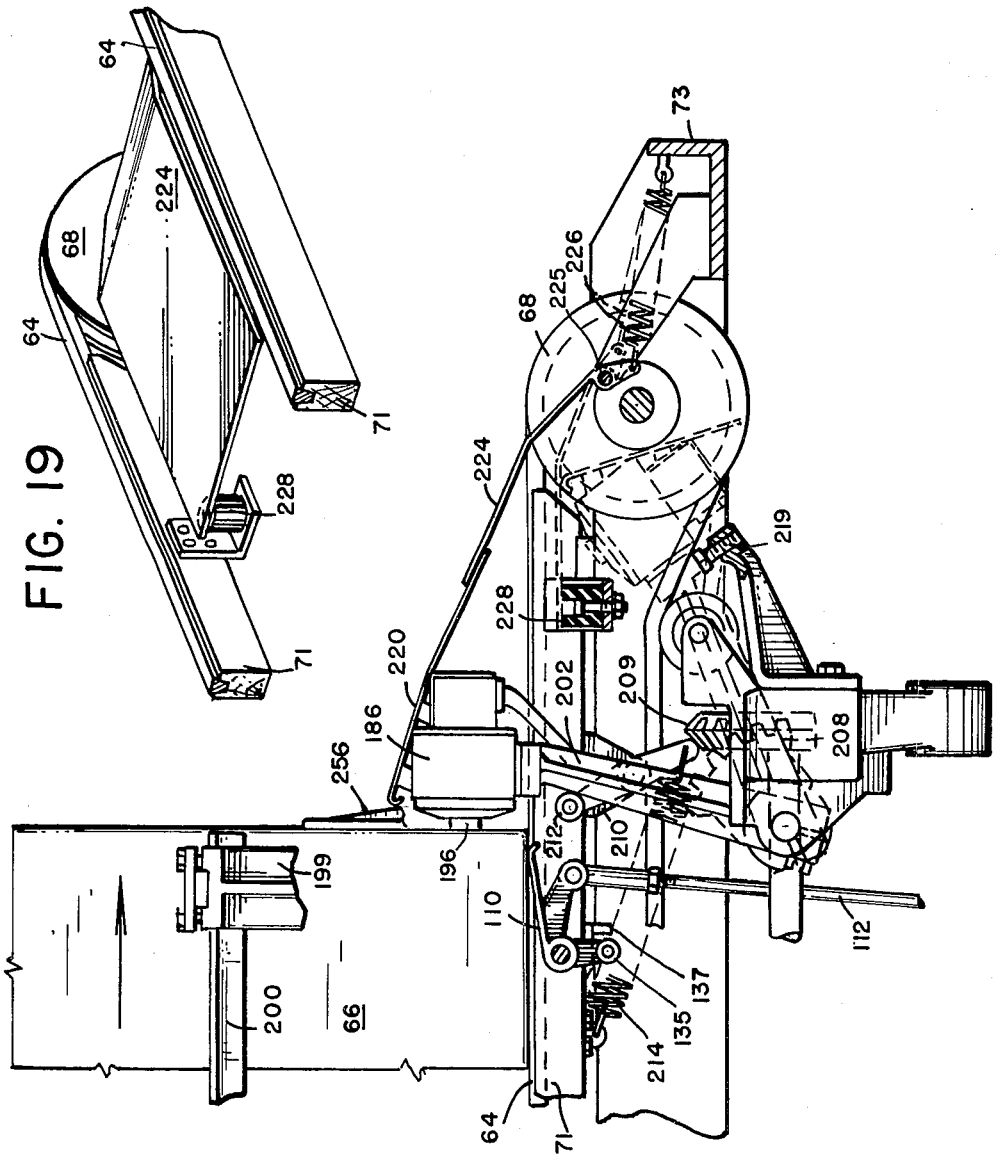
INVENTOR
HELMER ANDERSON
BY *William C. Stueber* ATTORNEY

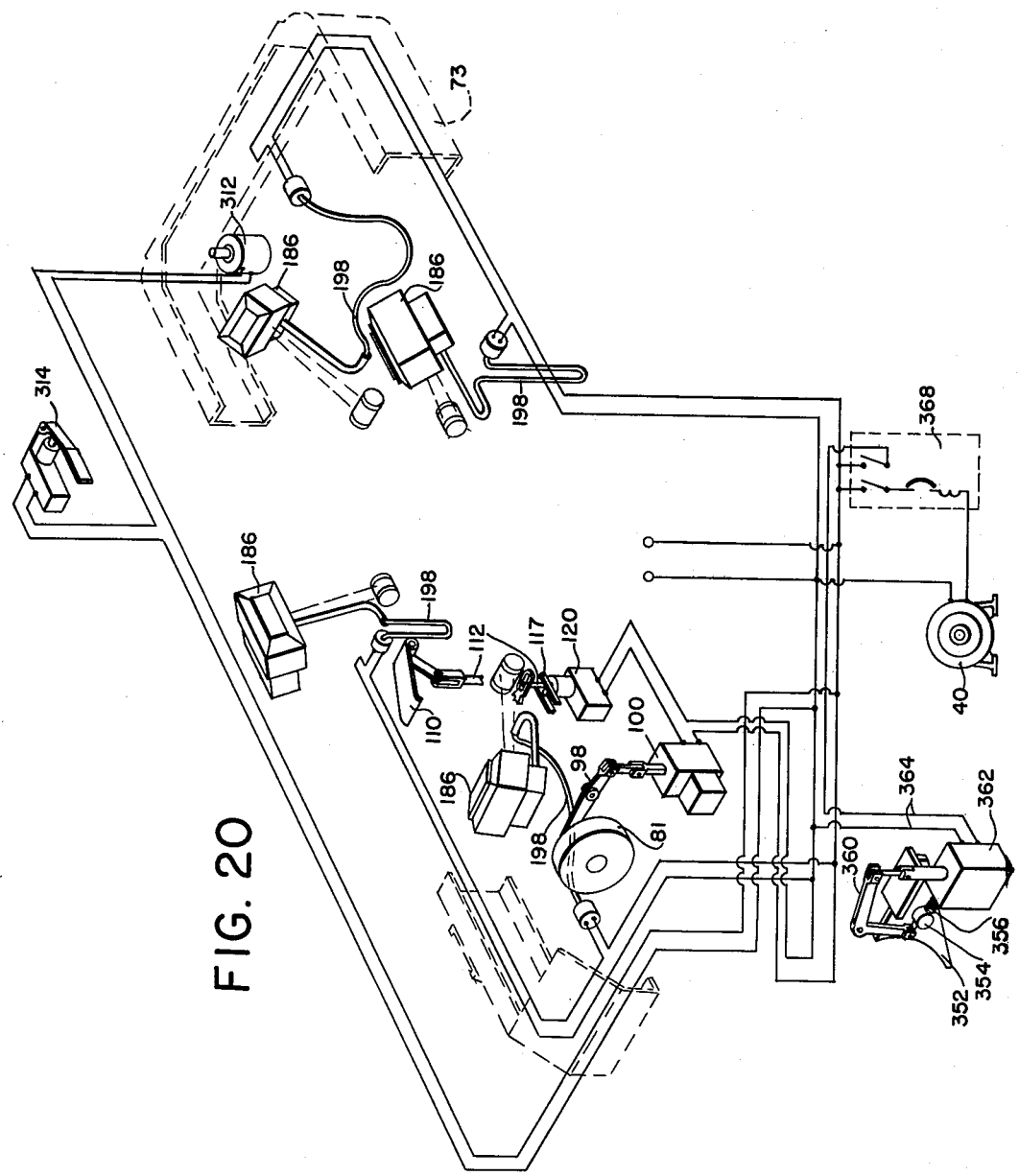

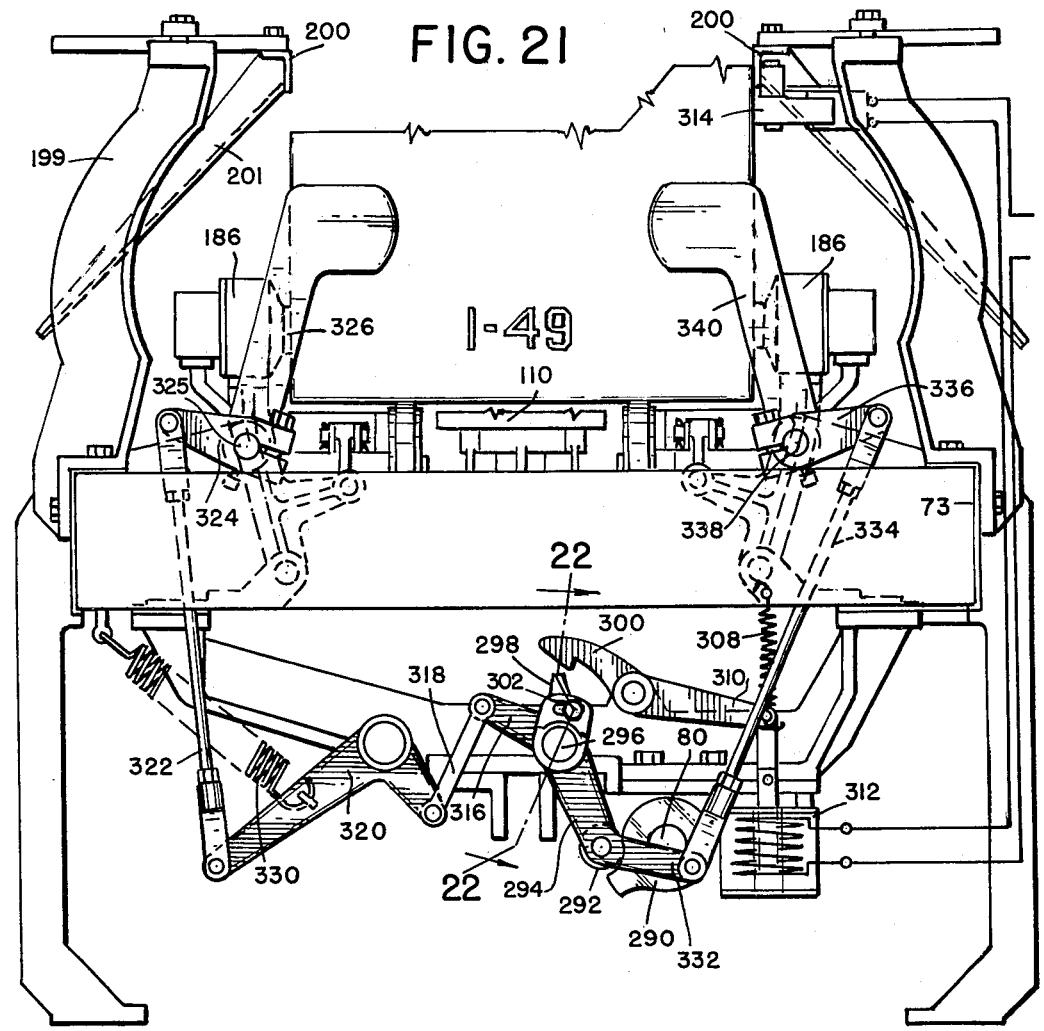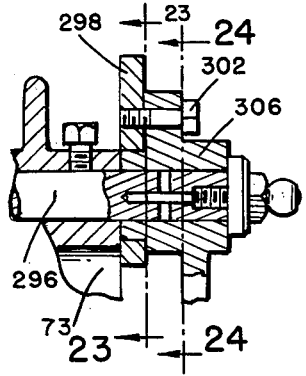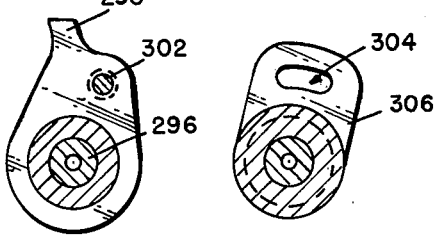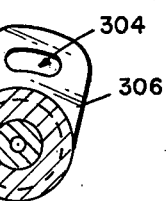
INVENTOR
HELMER ANDERSON
BY William C. Stueber ATTORNEY April 3, 1956

H. ANDERSON 2,740,351

BOX MARKING MACHINE

Filed Jan. 16, 1950

12 Sheets-Sheet 11

INVENTOR
HELMER ANDERSON
BY William C. Stueber ATTORNEY

April 3, 1956    H. ANDERSON    2,740,351
BOX MARKING MACHINE
Filed Jan. 16, 1950    12 Sheets-Sheet 12
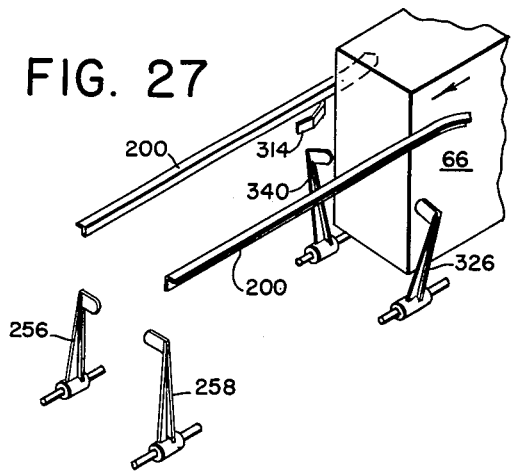
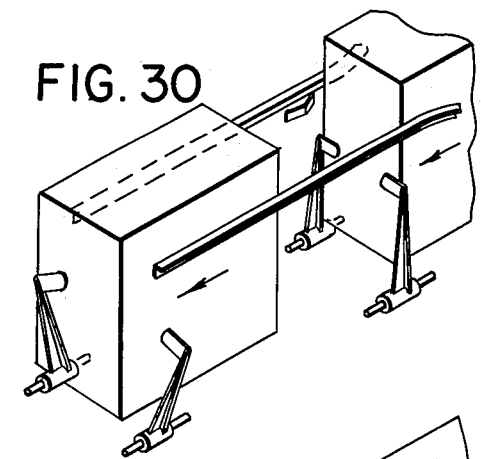
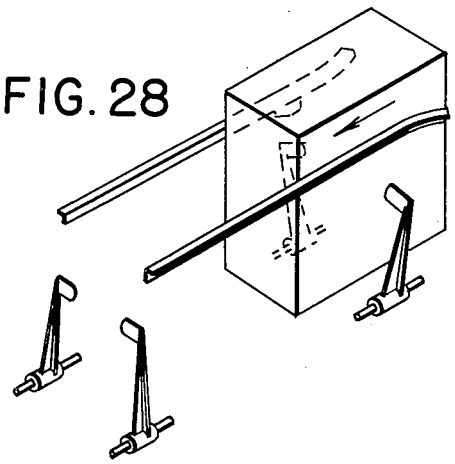
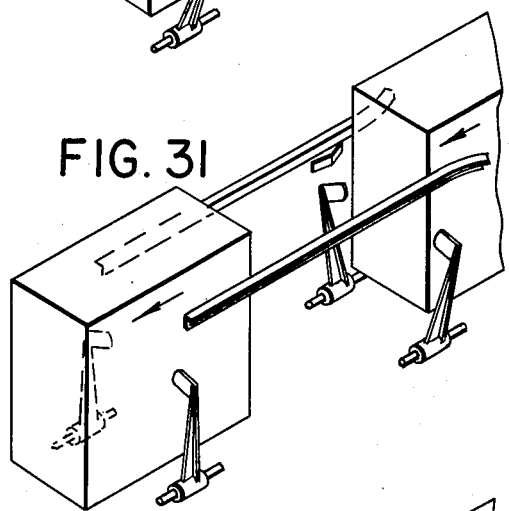
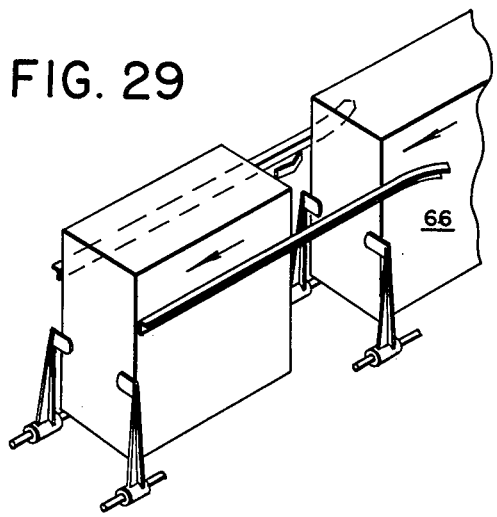
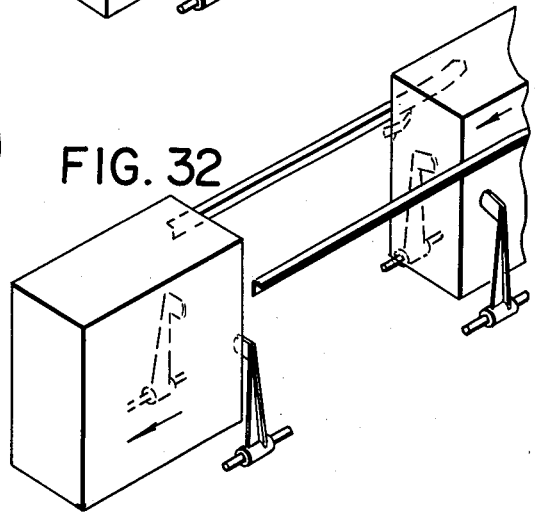
INVENTOR
HELMER ANDERSON
BY William C. Strieber
ATTORNEY United States Patent Office 2,740,351
Patented Apr. 3, 1956

2,740,351

BOX MARKING MACHINE

Helmer Anderson, Minneapolis, Minn., assignor to General Mills, Inc., a corporation of Delaware Application January 16, 1950, Serial No. 138,892

19 Claims. (Cl. 101—11)

This invention relates to improvements in machines for automatically and successively stamping or branding identification markings on a series of objects, such as fibreboard cartons.

An object of the invention is to provide a machine which will automatically place identifying marks on the four sides of a series of rectangular objects, such as cartons or packing boxes, separating the boxes one at a time from a group, passing them to a working station, and there branding identification indicia on the four sides, automatically and rapidly repeating the process on succeeding boxes.

An important object of the invention is to provide a device which will safely operate to brand sides of rectangular boxes by the use of heated irons without danger of damaging the box or creating a conflagration and which will operate to brand the four sides of the box with distinct and uniform markings.

A further object is to provide a mechanism which will automatically press and hold heated branding devices against the sides of a rectangular box for an accurate predetermined period of time and which will, in the event of power failure, when the heads are in contact with the box prevent heat damage to the box by automatically moving the heads out of contact with the box.

Another object is to provide a device which will at all times safely shield the heated stamping devices from the operator, from the box when being conveyed past the heads, and from foreign matter which may conflagrate.

A further object is to provide a branding machine which will brand indicia on the sides of various cartons constructed of different materials which vary in their capacity to withstand heat and vary in the amount of heat required to create a branded mark which has clear contrast with the box for ease of recognition.

Figure 26:
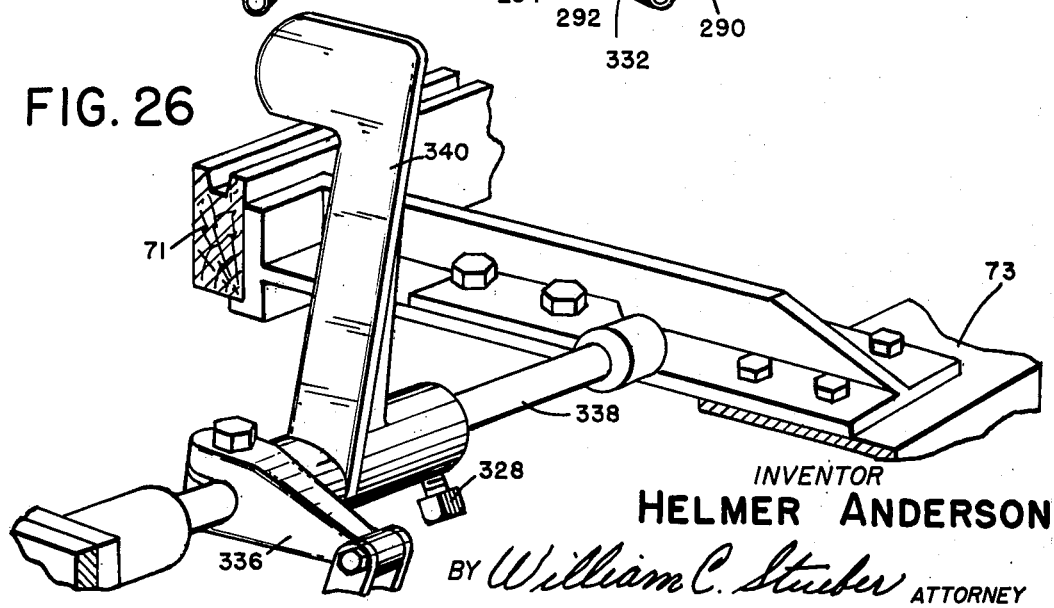

These and other objects will become apparent in the following specification taken in connection with the accompanying drawings in which:

Figure 1 is a side elevation of the box marking machine;
Fig. 2 is a plan view of the box marking machine;
Fig. 3 is a perspective view of the box marking machine with parts removed for clarity;
Fig. 4 is a sectional view of the one-revolution clutch mechanism taken from the box entering end of the machine;
Fig. 5 is a side elevation of the tripping mechanism with portions broken away for clarity;
Fig. 6 is a detailed view of a portion of Fig. 5, showing the switch depressed;
Fig. 7 is a plan view of the tripping mechanism with portions removed for clarity;
Fig. 8 is a detailed view of a portion of Fig. 7;
Fig. 9 is a front elevation of Fig. 8;
Fig. 10 is a front elevation taken from the discharge end of the machine with parts omitted for clarity;
Fig. 11 is a perspective view of the adjustable cam plates;
Fig. 12 is a sectional view taken along line 12—12 of Fig. 10;
Fig. 13 is a side elevation of the air cylinder cushioning mechanism, being partially sectioned for clarity;
Fig. 14 is a plan view of the safety clutch mechanism;
Fig. 15 is a front elevation of the machine similar to Fig. 10, showing the parts in a different position;
Fig. 15a is a front elevation of the safety clutch showing the parts in a different position from Fig. 10;
Fig. 15b is a front elevation of the safety clutch similar to Fig. 15a, showing the parts in a different position;
Fig. 16 is a sectional view taken along line 16—16 of Fig. 15;
Fig. 17 is a perspective view of the box marking machine with portions removed for clarity;
Fig. 18 is a side elevation of the discharge end of the machine with portions in section for clearness;
Fig. 19 is a perspective of the discharge end of the mechanism with portions removed;
Fig. 20 is a schematic wiring diagram of the machine;
Fig. 21 is a rear elevation of the machine taken from the box entering end with portions omitted for clarity;
Fig. 22 is a sectional view of the adjustment device for the tripping finger;
Fig. 23 is a view taken along line 23—23 of Fig. 22;
Fig. 24 is a view taken along line 24—24 of Fig. 22;
Fig. 25 is a rear elevation of the machine similar to Fig. 21 showing the parts in a different position;
Fig. 26 is a perspective of a rear holding arm and its associated mechanism with portions broken away for clarity; and
Figs. 27 through 32 are schematic views illustrating the relative positions of the holding arms as boxes pass through the machine.

The mechanism embodying the present invention is shown as a device for branding identifying indicia on cartons, such as fibreboard shipping cartons. The cartons are of the type which are filled and sealed for shipping and placed on a conveyor leading to storage or shipping areas. The cartons are required to be stamped with indicia for relaying various information such as dates, lot numbers, code data, etc., which must be placed on the carton after it has been filled and is ready to be shipped. It is desirous to mark the four sides of the carton so the information is easily accessible no matter how the carton is stacked. The present preferred embodiment places the markings permanently and clearly by pressing a heated branding iron having raised indicia against the box for a predetermined period of time. The machine shown in the preferred form marks the objects by branding but could be adapted to use with a device which employs marking means printing with ink. It is to be understood that though shown in the preferred form, many of the features of the invention could be used to great advantage in machines of other classes.

The branding machine is built as a unit and is conveniently placed at the end or intermediate portion of a chute or a conveyor which supplies a series of cartons; for example, the machine may be placed in an assembly line, receiving the cartons after they have been filled, stamping them and passing them on to a closing station.

The branding machine will take the foremost box from its waiting station on the supply conveyor belt and separate it from the adjacent boxes, transporting it to the branding station where the data is branded on the box. The box is then automatically passed onwardly and a new box is admitted to the branding machine to be marked. If no boxes are present on the conveyor belt, the branding machine remains at rest. The entrance of a box into the branding machine automatically begins a cycle of operation which terminates after the box is branded and passed on.

For ease of following the construction and operation of the machine, the description will be separated into convenient phases of the machine.

The power operating mechanism

In the preferred embodiment, referring principally to Figs. 3 and 17, the machine is operated by an electric motor 40 which is connected to a gear reduction box 42 having an output shaft 44 which carries a sprocket 46. This sprocket, through chain 48 and driven sprocket 50, rotates a transverse shaft 52 at the forward end of the machine. The transverse shaft carries sprocket 54, carrying a chain 56 which operates conveyor shaft 58 through sprocket 60 on the shaft which carries and continuously drives a pair of pulleys 62. A pair of spaced conveyor belts 64 run over the pulleys to convey a box 66 through the machine in the direction indicated by the arrows. The other ends of the belts are carried by idler pulleys 68 rotatable on shaft 70 and for support between pulleys the belts move in grooved support members 71. Spring loaded belt tightener 72 of a well known type bears against the belts to keep them taut. All elements of the machine are mounted on a suitable framework 73.

Tranverse shaft 52 also carries a bevel gear 74 which operates meshing gear 76 mounted to rotate on the main cam shaft 80 mounted on the sleeved end 78 of a conventional one-revolution clutch 81. The one-revolution clutch 81, shown in detail in Fig. 4, taken from the rear end of the clutch, comprises a driver clutch cone 82 having teeth 84 on its inner surface and carried at one end of the sleeve to engage a driven clutch element mounted on the cam shaft.

The driven element of the clutch engages with the clutch cone for one revolution intervals and rotates the cam shaft to operate the machine through its branding cycle. The driven element comprises a casting 88 keyed to the cam shaft and carries a pivotal clutch pawl 90 which has an engagement finger 92 for engaging the inner teeth of the clutch cone and a disengagement finger 94 for releasing the engaging finger. A coil spring 96 connected between the pawl and casting urges the engagement finger toward engagement and opposing this engagement the disengaging finger normally abuts the free end 97 of a disengaging rocker arm 98 which holds the pawl out of engagement. The opposite end of the rocker arm is connected to the plunger of an engaging solenoid 100 and a spring 102 holds the rocker arm in position to abut the disengagement finger. Energizing the solenoid 100 will rock the rocker arm 98 to the dotted line position of Fig. 4, releasing the disengagement finger 94 to permit the spring 96 to pivot the pawl 90 counter-clockwise and cause the engagement finger 92 to catch the clutch teeth 84. The clutch, then being in engagement, will begin rotating the cam shaft 80. Before the clutch has been rotated through one revolution, the solenoid is de-energized and the rocker arm rocks back to the full line position of Fig. 4. It is evident that the end of the rocker arm will be struck by the disengagement finger as the clutch rotates back to starting position. The pawl will be pivoted to disengagement and the rocker arm will act as a stop, stopping the cam shaft in its neutral position. To hold the cam shaft in neutral position, a holding roller 104 carried by a spring tensioned arm 106 snaps into a depression on a positioning disk 108, carried on the end of the cam shaft.

In branding operation the solenoid is energized and the clutch is engaged responsive to the presence of a box moving into the branding machine. This clutch engagement begins to revolve the cam shaft and begins a complete branding cycle of the machine. This cycle automatically ceases when the box is branded and the clutch is automatically disengaged at the end of the cycle.

The tripping mechanism

A mechanism is provided to be responsive to the presence of a box and to begin operation of the branding machine through its cycle only when a box arrives in the machine to be branded. A pivotal trip plate 110 is positioned between the belts and extends into the path of the box, as shown by the dotted line position of Fig. 5. The plate is connected to a downwardly extending contacting rod 112, as is best shown in Figs. 3, 5, 6, 7, 8 and 9. A spring 114 connected between the frame and rod holds the trip plate up into the path of the box. At the lower end of the rod a switch actuating plate 116 is carried between the bifurcated ends of a floating switch actuator rocker arm 117 which is pivoted at a midpoint and a compression spring 118 between the frame and end balances the weight of the plate. The switch plate rests on the plunger 119 of a solenoid switch 120 and the end of the rod normally abuts the upper face of the plate. Electrical leads 122 connect through the switch to the clutch disengaging solenoid 100 from a main source of electrical power. A shifting lever 124 is pivoted at a midpoint and one end 128 contacts a switch release cam 130 on the main cam shaft 80 while the other end holds the contacting rod in a slot 132. A spring 134 between the lever and frame holds the end against the cam. To prevent the spring 114 from withdrawing the contacting rod 112 from the slot 132, a lower arm 135 of the trip plate strikes a limit stop 137 on the frame.

The elements are shown in their normal position just before the trip plate is depressed by an entering box by the dotted line positions of Fig. 5.

For branding operation, the carton, moving into the branding position on the conveyor belts, depresses the trip plate 110 to the full line position of Fig. 5, pushing the contacting rod 112 downwardly on the switch actuating plate 116 to depress the plunger 119 of the solenoid switch 120, shown in Fig. 6, and energizing the clutch engaging solenoid 100.

When the solenoid is energized the solenoid pivots the rocker arm 98, allowing the clutch to engage and rotate the cam shaft through its one revolution, as previously described.

In order to permit the clutch to automatically disengage, the solenoid must de-energize to pivot rocker arm 98 back to the solid line position of Fig. 4 before the clutch has rotated through one revolution. To de-energize the solenoid, the solenoid switch is released. To this end, after the main cam shaft has completed part of its revolution, the cam 130 (Fig. 7) pushes against lever end 128 to pivot the shifting lever 124 from the dotted to the solid line position of Fig. 8, sliding the contacting rod 112 off the plate 116, releasing the depressed switch plunger 119, thus breaking the circuit and de-energizing the solenoid thereby causing the clutch to disengage and stop the shaft at the end of the revolution.

After the shaft has completed its one revolution the branding cycle is complete and the box is free to move out of the machine. The lever end 128 will be released and the spring 134 will pivot the shifting lever to push the rod 112 against the edge of the plate 116, as shown in the full line position of Fig. 9. With the box removed, the trip plate 110 will be released, permitting the spring 114 to raise the contacting rod 112. The shift lever 124 will pivotally move the end of the contacting rod back on the plate 116, as shown in the dotted line position of Fig. 9.

It will be noted that if the box does not move out of the machine and off of the trip plate, the rod 112 will continue to be depressed and the contacting rod extending below the edge of the plate 116 (Fig. 9) cannot move back onto the plate. The operating cycle of the machine will not reoccur until the branded box moves out of the machine. Only if the trip plate 110 is released to permit the rod 112 to lift above the plate 116 will the apparatus be in position to again operate the solenoid 100 to re-engage the clutch 81.

The branding members

The main cam shaft in its one revolution operates the machine through one cycle of operation and must, in that cycle, move the heated branding heads into contact with the box, hold them there for a definite period of time during which the box is branded, and then move them away from the box. As shown in Figs. 10 and 15, viewed from the discharge end of the machine, the branding head actuating cam 136 carried on the cam shaft 80 operates a follower roller 138 carried by rocker lever 140 which operates through a series of linkages to actuate the branding heads. When the follower 138 is adjacent the low portion of the cam 136, the branding heads 186 are released to move out of contact with the box. As the cam shaft rotates clockwise, as viewed from the discharge end of the machine, and the follower roller rides up to the high portion of the cam, as shown in Fig. 10, the branding heads are moved in contact with the box and they will remain in contact until the cam shaft rotates sufficiently for the low portion of the cam to be reached, as shown in Fig. 15.

The branding heads operate at a constant and predetermined temperature with or without a thermostat. Since boxes of various materials, which vary in susceptability to heat, must be accommodated, the time of contact of the branding head with the box is adjustably controlled. Boxes constructed of material requiring little heat to form a legible indicia are contacted only for a brief moment by the branding head, whereas dark-colored boxes or those requiring more heat are contacted by the branding heads for a longer period of time.

To this end the branding head actuating cam 136 is adjustable to vary the peripheral length of the high point of the cam. The cam comprises two sections, a cam plate 144 which raises the follower, and a cam plate 146 which returns the follower, Figs. 11 and 12, each having a high and a low shoulder and being mounted face to face. The cams are clamped together on the shaft by studs 148 threaded into flange 150 which is fixed to the cam shaft. The studs pass through arcuate slots 152 which permit the cams to be rotatably adjustable with respect to each other. To increase the time of branding contact, the rear cam plate 144 is rotated counter-clockwise with respect to cam plate 146 thereby increasing the total length of time the follower will ride against a high portion. To decrease the time, cam plate 144 is rotated clockwise.

A connecting link 154 connects the end of the follower rocker lever to the end of a pivotal arm 156 which pivots on the shaft 157 which is rotatably carried by the frame. The other end of the pivotal arm 156 carries a safety pivotal clutch pawl 158 which engages a notch 160 in the clutch disk 162. The disk 162 and bell crank 164 are fixed to the shaft 157 to pivot together (shown in detail Fig. 16), and connecting links 166, 168 on each arm of the bell crank are each attached to a crank arm 170 carried on the end of the right and left longitudinal oscillating shafts 172 and 174. These shafts extend longitudinally along the machine (Fig. 17) and a crank 176 is adjustably mounted thereon. A cross rod 178 is pivotally attached to the crank 176 and the other end of the rod extends across the machine and into a hole in a connecting member 180 where it is adjustably secured by setscrew 182. The connecting member 180 is rotatably connected to a pivotally mounted branding arm 184 carrying a branding head 186 at the outer extremity. The arm is pivotally mounted on a plate 188 which adjusts in a transverse direction on a cross member 190 having a saddle 192 slidable on longitudinal bars 194, these being carried by the main frame 73.

The branding heads consist of a box carrying a heating element with raised indicia 196 to brand the box. Electrical leads 198 (Fig. 20) connect the heating element to a power source. Vertical frame members 199 carry side rails 200 extending along the sides of the machine and fixed shields 201 are secured to the side rails and extend outwardly to protect the heated heads from being contacted by inflammable material and the like (see Figs. 1, 2, 21 and 25).

Referring again to Fig. 17, the end branding heads, also numbered 186, for marking the ends of the box are carried on pivotal arms 202. The arm on the discharge end of the machine is pivotally mounted on the frame at 204 and the arm at the entering end of the machine is laterally adjustable by virtue of its being mounted on a saddle 206 slidable on the bars 194.

The base of the pivotal arm 202 on the discharge end carries a bevel gear segment 208 and a meshing gear segment 209 is carried on the longitudinal oscillatory shaft 172. The base of the pivotal arm 202 on the entering end carries a bevel gear segment 208 and a meshing gear segment is journaled in a transverse extension of the saddle 206 and keyed to shaft 174. It will be apparent that the gear segments will remain in mesh when the saddle 206 is longitudinally adjusted.

For branding the ends of the box, the arms 202 pivot from spread position between the conveyor belts to an upright position against the side of the box and the side arms 184 pivot from the sides against the box. To urge the heads back to spread position, out of the path of the box, a pivotal spreading arm 210 (Fig. 18) carries a roller 212 which is urged against the branding arms 202 by a spring 214 connected between the frame and the end of spreading arm 210. As the branding arm moves to contact position it strikes the roller 212, pivoting the arm 210 and tensioning the spring 214. The spreading arm 210 acts on the head only for a small portion of its pivot to spread position and prevents damage to the machine if operated to move the heads to contact position when a box is not present. To cushion the rapid spread of the arm a conventional pneumatic air escapement cylinder and plunger is provided, as shown in detail in Fig. 13. The cylinder 216 is mounted on the frame 73 and the plunger 217 connected to an arm 218 carried by the shaft 172. Since all the arms are interconnected, the fall of each of them will be checked. The branding head 186 strikes a stop bolt 219 which provides a limit for the spread movement of the arms.

To protect the end branding heads from contact with foreign and inflammable elements and to insulate the box as it is conveyed past the heads, a unique system of protecting shields is provided. The end heads 186 carry an inclined fixed shield member 220 which extends away from the box and which supports a principal shield member 224 which is pivoted on a cross shaft 225 supported by the frame between the idler pulleys 68. When the head moves to contact position, it raises the principal shield 224 and, when it moves outward to spread position (as shown by the dotted line position of Fig. 18), it slides under the principal shield, which drops between the conveyor belts (Fig. 19) covering the head completely. A spring 226 connected between the base of the shield and the frame pulls the shield to hold it downwardly against resilient stop 228 which prevents the shield from contacting the raised indicia 196.

It is to be noted that by the arrangement of elements the entire operating machinery is kept below the path of the boxes, permitting ease of providing adjustment mechanism for adaptation of the machine to handling various size boxes. Also, boxes having open flap tops can be run through the machine and branded on four sides without danger of the loose flaps interfering with any of the moving parts or contacting any heated surfaces.

In operation (Figs. 10, 15, 17 and 18) as the cam shaft 80 begins its clockwise rotation (as viewed from discharge end) through one revolution, the rocker lever 140 is pivoted by the roller 138 moving onto the high shoulder of the cam 136, causing link 154 to pivot arm 156. The safety pawl 158, engaged in the notch 160, pivots disk 162 and bell crank 164 which, through links 166 and 168, pivots the crank arms 170.

Both oscillatory shafts 172 and 174 are rotated outwardly, pivoting the crank arms 176 outwardly and causing the connecting rods 178 to pull the branding heads 186 up against the side of the box. The shafts 172 and 174 also rotate the bevel gear segments 208 and 209 to move the end branding heads 186 against the end of the box.

The box, resting loosely on the conveyor belts, has nothing to resist the horizontal components of force of the branding heads and the opposing heads will contact the box with equal pressure. Since the amount of heat transmitted from the heated branding head to the box is proportional to the pressure between the head and the box, the brands on opposing sides will be of equal intensity. To adjust the pressure between the side of the box and the head, the adjustable mounting plates 188 are moved laterally in or out. For large adjustments the position of the cross rod 178 in the connector 180 must be adjusted to assure that the stamping indicia 196 will be flat against the box when the heads are in stamping position. To adjust the pressure between the box and end stamping heads, the end saddle 206 is moved in or out and the bevel gear 209 on the oscillating shaft is similarly moved.

The intensity of the brand is also controlled by the length of time which the branding head dwells against the carton side which is controlled by the adjustable cam 136. In the event the carton is of delicate structure so that a lighter pressure is required, the arms may be adjusted to increase the distance between them at contact position. A longer time of dwell may be provided by adjustment of the cam to transmit more heat to the carton and gain an adequate brand.

Thus adjustments of the time of dwell and amount of pressure may be cooperatively made to obtain proper heat transmission between the box and branding head. If the pressure between box and head is increased, the time of contact decreased, and if the pressure is decreased, the time of dwell is decreased. It will also be seen that the present invention makes possible the variance of either factor independently. The time of dwell of the branding head may be adjusted without varying the pressure of contact between the heads and the box and the pressure may be altered without varying the time of contact.

To continue operation, the head actuating cam 136 continues its rotation, the follower roller 138 dropping to the low part of the cam. The pivotal spreading arm 210 and the weight of the heads cause the branding arms to move the heads to spread position where the cam shaft reaches the termination of its one revolution and the clutch automatically disengages.

*The forward holding arms*

The forward arms are positioned at the discharge end of the machine and are operated, as are the other elements, from the main cam shaft. Fig. 10 illustrates the position of the driving linkage with the arms 256 and 258 in closed position, extending into the path of the box, to hold it at the beginning of the branding cycle. The box moves along its path between guide rails 200, being conveyed on the conveyor belts until it strikes the forward holding arms to be held thereagainst with the conveyor belts continuing to move under the box. Fig. 15 illustrates the same mechanism with the arms at open position after the box has been branded. The forward arm actuating cam 261 is carried on the cam shaft 80 and operates a follower roller 262 carried on the lower end 264 of a follower rocker arm 266 which also connects to the lower end of a cross link 270, the upper end 272 being bent at an angle and being connected to a pivotal arm 277 secured to pivotal arm 274. A spring 273 between the cross link 270 and clip 275 on the frame holds the follower to the cam. The upper end of arm 274 connects through a short link 278 to the lower crank arm 280 of the right holder arm 258, as viewed from the discharge end. The crank arm and holder arm are adjustably carried on a shaft 282 which is pivoted on the frame 73. A spring 283 between the arm 274 and frame assists spring 273.

The upper end of the follower rocker arm 266 connects through a short link 284 to the lower crank arm 286 of the left holding arm 256. The crank arm and holder arm are adjustably carried on a shaft 237 carried on the frame 73.

In operation, the cam is rotated clockwise as viewed from the discharge end and motion is transmitted through the above described linkages in apparent manner to cause the following operation of the holding arms.

As a box is admitted to the branding machine the conveyor belts 64, moving continuously, carry the box onto the trip plate 110 to begin the branding cycle by engaging the one revolution clutch. The forward holding arms 256 and 258 remain closed from the end of the previous branding cycle and extend into the path of the box (Figs. 21, 27, 28, 29). The box is conveyed against the arms and is held there until the branding is completed when the arms move out of the path to release position (Fig. 30).

As the box has moved partially past the arms, the follower 262 moves off of the high portion of the cam 261 and the arms are released against the side of the box (Fig. 31), being held there by the tension of springs 273 and 283. As the rear edge of the box passes, the arms snap behind the box (Fig. 32). During this time the follower roller 262 has been opposite a low portion of the cam 261, but prevented from moving to contact the cam by the arms riding on the side of the box. At the end of the cycle the forward arms are again in the holding position to receive the new box whenever it should enter the machine and the follower pin 262 is in contact with the cam 261.

*The rear holding arms*

The rear holding arms at the entering end of the machine are operated in part by a linkage from the main cam shaft, as shown in Figs. 21 through 26. Figs. 21 and 25 taken from the entering end of the machine show the cam shaft 80 carrying an arm opening cam 290 which operates against follower roller 292 carried by the follower arm 294. At the pivotal carrying shaft 296 the arm carries an adjustable finger 298 to be caught by pivotal latch 300. The finger is adjustable by virtue of a stud 302 threaded into the finger and extending through a concentric slot 304 in the collar 306 fixed to the rocker arm (Figs. 22, 23, and 24). The latch 300 is held to engaging position by a spring 308 connected between the latch end 310 and the frame. A tripping solenoid 312 connects to the latch end to pivot the latch to release position when energized. The solenoid is connected to a suitable source of electricity and a contact switch 314 mounted on the guide rail 200 in the path of the boxes is connected in the circuit. The switch is adjustable along the rail.

The upper end 316 of the rocker arm 294 connects through a link 318 to a bell crank 320 which connects by means of a second link 322 to a crank arm 324 secured on the shaft 325 carrying the left rear holding arm 326. The arm is journaled on the shaft and adjustably locked thereon by a setscrew 328 which permits both rotary and lateral adjustment of the arm with respect to the shaft. A closing spring 330 between the bell crank 320 and frame urges the arms toward holding position in the path of the boxes. The lower end 332 of the rocker arm, which is integral with the rocker arm body 294, connects through a long link 334 to the right crank arm 336 which is fixed to the shaft 338 adjustably carrying the right holding arm 340 in the same manner as the left arm (detail shown in Fig. 26).

In operation, at the end of the branding cycle the latch 300 remains in engagement with the finger 298 and holds the rear holding arms 326 and 340 open (Figs. 25 and 27). When a box arrives carried on the supply conveyor 343 and moves into the branding machine, it closes the contact switch 314 at the side of the path energizing the solenoid 312 to release the latch 300 and allow the arms 326 and 340 to snap against the side of the box 66 (Fig. 28). As the rearmost edge of the box passes the arms snap behind the box (Fig. 29) thereby blocking and holding any succeeding boxes which may arrive and preventing them from entering the branding machine while a box is being branded. When the box has been branded and the forward arms have opened (Fig. 30), the rear arms will be opened (Figs. 25 and 31) by the action of cam 290 operating through the above described linkage in the apparent manner. The arms will then again remain latched open until the tripping solenoid 312 is energized to trip the latch 300 by the arrival of a succeeding box closing contact switch 314.

The branding machine is often used to receive boxes from a sealer or a packer which operates more slowly than the brander. Frequently an interval will occur between the boxes, making it necessary to have a machine capable of handling boxes sporadically delivered. The machine is also well suited to handling boxes delivered in close congestion as the rear arms, snapping against the sides of the box before it has passed, will slip between the boxes to separate them. Where shorter boxes are used, the switch 314 and arms 326 and 340 may be moved toward the forward or discharge end of the machine to lessen the space between the discharging and entering boxes, thereby lowering the time required for a box to travel from the rear to the forward end of the machine.

The safety clutch

In the event of an electrical failure at the motor terminals, stalling the motor when the heads are in contact with the box, the box will become overheated in the vicinity of the heads and catch fire. To prevent this, an automatic safety device has been provided which releases the heads to permit them to move to a non-contact position when the power fails.

As shown in Figs. 10, 14, 15, 15a and 15b, the safety device functions by interrupting the drive linkage between the main cam shaft and the heads by disengaging the safety pawl or safety dog 158 from the notch 160 in the disk 162 when electrical power is cut off.

The safety pawl 158 is pivotally carried at its midpoint on the pivotal arm 156 and has a disengaging tension spring 344 attached between it and the pivotal arm 156 which constantly urges the dog to pivot its engaging point 346 out of engagement with the notch 160 in the disk. The dog carries a roller 348 which rides along a curved path swung from the axis of the shaft 157 formed by the curved edge 350 of a movable pawl engaging plate 352 which pushes the engaging point of the pawl into engagement with the disk 162. An eye-bolt 354 is carried by the plate and a rod 355 extends through the eye-bolt. A pawl engaging spring 356 is confined between a nut 358 on one end of the rod 355 and the eye-bolt 354. The opposite end of the rod is connected to the lower arm of a bell crank 360 and the upper arm of said bell crank is connected to the plunger of a solenoid 362 which is connected across the power terminals of the motor 40 by the leads 364, as shown in the wiring diagram of Fig. 20. A spring 363 between the bell crank and frame pivots the crank 360 to laterally move the plate 352 to allow the pawl 158 to disengage when the solenoid 362 is de-energized.

When the machine is put in operation, the power circuit through the driven motor 40 and the solenoid 362 is completed by manually closing the main switch 368 and the solenoid plunger will move to energized position, thus moving the bell crank 360 to the position shown in Figs. 10 and 15, pivoting the bell crank, pulling the rod 355 to the left, causing the spring 356 to compress and hold the engaging plate edge 352 tightly against the roller 348, thereby holding the safety dog 158 in engaged position. Switch 368 (Fig. 20) is provided with overload protection and any interruption of power, such as the switch 368 opening due to overload and stopping the motor, will also interrupt the current to the solenoid to de-energize it. The pawl disengaging spring 344 and spring 363 will then take over, disengaging the safety pawl by pivoting the point 346 out of the notch 160 and pushing the engagement plate 352 to the right, as shown by the relative position of the parts in Fig. 15a. The released notched disk 162 may then rotate independently of the dog and carrying arm 156. The branding heads 186 having their centers of gravity outside their pivotal point and being urged to non-contact position by arms 210, immediately spring away, out of contact with the box, preventing any danger of a conflagration. This movement of the heads will rotate the disk 162 counter-clockwise, as viewed from the discharge end, so that the notch 160 will no longer be opposite the engaging point 346, as shown by the relative position of the parts in Figs. 15a and 15b.

Thus it will be seen that I have provided a safety device which will, when the motor is stopped due to the overload switch opening the circuit or due to failure of supply current, automatically release the branding heads, moving them away from the box, preventing any danger of fire.

In the event the electrical power is again restored after the heads have pivoted to spread position and the disk 162 has rotated to where the engaging point 346 of the dog is opposite a high point on the disk, the engaging spring 356 will compress, allowing the plunger of solenoid 362 to move to energized position, pivoting the bell crank 360, without moving the plate 352, the spring 356 taking up the motion between the plate and bell crank (detail shown in Fig. 15b) preventing undue strain on the linkage and machine elements and preventing the solenoid from burning out.

General Operation

The operation of the machine will have become clear during the description of the structure and operation of the various elements of the machine; however, an overall summary of operation will now be presented.

As the box enters the machine, prior to the initiation of the operation cycle of the machine, it finds the rear holder arms opening being so held by the latch 300. The conveyor belt carries the box into the machine where it strikes the contact switch 314, causing solenoid 312 to trip the latch and permit the holder arms 326 and 340 to snap against the side of the box and ride there until the box passes, when they pivot behind it to prevent the succeeding boxes from entering. The box is conveyed against the forward holding arms 256 and 258 which are closed where the box automatically starts the machine operating through its cycle of operation by depressing the trip plate 110, thereby closing the solenoid switch 120 to engage the one-revolution clutch 81 and start the cam shaft 80 revolving through its one revolution.

The branding head actuating cam 136 pivots rocker lever 140 to operate through the safety clutch to rotate the oscillating head operating shafts 172 and 174. The shafts cause the heads 186 to move against the sides of the box, hold them there for a predetermined period of time, and then allow the heads to drop back to spread position. The protecting shields 224 ride up with the movement of the end branding heads to contact position and down as the heads move to spread position. When the heads have begun to move away from the box the forward arm operating cam 260 opens the forward holding arms 256 and 258 to allow the box to be conveyed out. The rear arm operating cam 290 opens rear holding arms 326 and 340 and they remain held open by the latch 300 to admit a next carton. After the branded box has begun to move out of the machine, the actuating cam allows the forward arms 256 and 258 to move against the side of the box where the arms ride until the box passes and they snap behind the box to stop and hold the incoming box. The one-revolution clutch automatically disengages to complete the cycle and the machine is ready for a succeeding cycle to be initiated by a box entering the machine and again depressing the trip plate 110.

While the invention is susceptible of various modifications and alternative constructions, I have shown in the drawings and have described in detail the preferred embodiments. However, it is to be understood that I do not thereby intend to limit the invention to the specific form disclosed, but intend to cover all modifications and alternative constructions falling within the spirit and scope of the invention as expressed in the appended claims.

I claim as my invention:

1. In a machine for branding the surface of a box, the combination of a heated branding head movable between a branding position contacting the box and a non-branding position, means urging the head to non-branding position, electrically operated driving means having a first engaging element moving about on axis, a transmitting linkage connected to the head and adapted to move it from non-branding to branding position, the linkage including a second engaging element movable about said axis, electrical engaging means moving said second engaging element into engagement with the first engaging element when electrically energized, means continually urging the engaging elements toward disengagement so that they will become disengaged with electrical failure, and an electrical source connected to both said electrical engaging means and said driving means so that failure of the power will permit said urging means to move said first and second engaging means into disengagement to disconnect the driving means from the head.

2. In a machine for marking indicia on the surface of a box, the combination of a marking head movable to contact a box surface, a power means including a movable engagement member, means operably associated with the marking head adapted to move the head to contact with the box surface and having a moving element with a depression for receipt of said movable engagement member when in registry therewith, a solenoid connected to the engagement member to move it into said depression when energized, and a resilient link between the solenoid and the engagement member to assimilate the movement of the solenoid and prevent damage to the machine elements when the depression and the engagement member are not in registry.

3. In a machine for marking indicia on the surface of a box, the combination of a marking head movable to contact a surface, a power actuating means arranged to operate the marking head when linked thereto, a linkage means operatively connected to the head, one of said means having a disk turning about an axis and having a notch on the periphry and a high portion at the side of the notch, the other of said means having a pawl movable about said axis and movable in a radial direction to be engageable in said notch, the power actuating means operating the marking head through said linkage means when the pawl is engaged in the notch, a solenoid moving the pawl into the notch when energized, and a resilient link connecting the solenoid to the pawl allowing operation of the solenoid when the pawl and notch are not in registry and preventing damage to machine parts.

4. In a machine for marking indicia on the surface of a box, the combination of a marking head movable to contact a surface, a connecting means operatively connected to move the head and having a first engagement member, a powered actuating means having a cooperative second engagement member movable to engagement with the first engagement member when in registry therewith, a disengaging spring resiliently urging said first engagement member out of engagement, actuating means for moving said first engagement member into engagement, and a linkage operably connected to said actuating means and having an engaging spring therein, said engaging spring being stronger than said disengaging spring to overcome same when moving the first engagement member into engagement.

5. In a machine for branding the surface of a box, the combination of parallel spaced supports defining a path along which the box is moved, a heated branding head, means for heating the branding head, an arm pivoted between and below the spaced supports below the path of the box and carrying said head between a contact position above the supports against the box and a non-contact position below the supports, and a shielding heat-dissipating member pivoted below the supports and located between the box and head to prevent burning the box when it passes along said supports over the head, said shielding member being of a length to be supported by the head when in contact position, the shield being carried up by the pivoting head to move up and down with the head.

6. In a machine for branding the surface of a box, the combination of a pair of continuous moving conveyor elements spaced from each other and supporting a box to carry it along a path, a heated branding head, means to heat the branding head, an arm pivoted below the conveyor elements and carrying said head between a contact position above the conveyor elements against the box to a non-contact position below the conveyor elements, and a flat shielding member pivoted below the conveyor elements, said head having a supporting plate extending toward the shield on which the shield rests in contact position so that the head will pass beneath the shield when moving to non-contact position.

7. In a machine for marking indicia on the surface of a box, the combination of means providing a continuous supply of boxes, a conveyor for carrying boxes along a path through the marking machine, a first holding gate extending into the path at the rear of the conveyor, a second holding gate extending into the path at the forward end of the conveyor for holding the boxes to be marked, means operatively associated with the first and second holding gates moving them out of the path after a box has been marked and closing the second gate, and means responsive to the presence of a box and being mounted between said gates, said responsive means being operatively connected to said first gate to close it when a box enters the branding machine.

8. In a machine for marking indicia on the surface of a box, the combination of means providing a supply of boxes, a conveyor for carrying boxes along a path from the rear to the forward end of the marking machine, a first holding gate extending into the path at the rear end of the machine, means continually urging said first gate into the path, a second holding gate extending into the path at the forward end of the machine, a device responsive to the presence of boxes behind the forward gate, means operatively associated with said box responsive device and said first and second holding gates moving said holding gates out of the path a predetermined time after the box enters the machine, and latch means adapted to catch and hold the first gates open, means responsive to the presence of a box positioned in the path ahead of said second holding gate a distance less than the length of the box and operatively associated with the latch to release the first gate when contacted by an entering box.

9. In a machine for marking indicia on the surface of a box, the combination of a conveyor moving a box through the machine, marking heads movable to contact and mark the box in each cycle of operation, power actuating means operably connected to the marking heads to mark the box and having an electrically engageable clutch means which automatically disengages after one cycle of operation, a power line electrically connected to said clutch, a plunger switch in circuit between the power line and clutch and engaging the clutch upon depression of the plunger, a trip plate extending into said path at the branding station and having a connecting rod abutting the switch plunger to close the switch upon depression of the treadle by the box, and means operable by the clutch and operatively associated with the plunger to push the connecting rod off of the plunger after a portion of the cycle has occurred.

10. In a machine for marking indicia on the surface of a box, the combination of means for moving a box along a path through the marking machine, marking heads movable to contact and mark the surface of a box, a main cam carrying shaft, a cam linkage operably connected between the heads and shaft to operate the heads, an electrically engageable clutch means adapted to rotate the shaft on engagement, said clutch being automatically disengaged at the end of a predetermined period during which a box is marked, power means operably connected to the clutch to rotate said shaft upon clutch engagement, a plunger switch in circuit with said clutch means to engage the clutch upon contact, a depressible trip plate urged into the path of the box and having a contacting rod abutting the switch plunger, a shifting lever connected to the rod and operably associated with the cam shaft to move the rod off the switch plunger before the termination of said predetermined period, means restricting movement of the rod to a given radial plane, and means urging the rod toward the plunger in said plane to assure re-alignment of the rod and plunger after operation of said shifting lever.

11. In a branding machine for marking indicia on a box, the combination of a means continually moving a supply of boxes toward the branding machine, a conveyor moving a foremost box along a path through the branding machine, a gate positioned between the conveyor and moving means and movable between a first position in the path and a second position out of the path, means for moving the gate to second position, means constantly urging said gate to first position, latch means holding said gate in second position, and box responsive means in said path a distance ahead of the gate less than the length of the box and being operatively associated with the latch to release the gate to first position when a box contacts said responsive means, said box responsive means and gate being relatively adjustable in the direction of box movement.

12. In a machine for branding boxes, the combination of horizontal support means freely supporting a box from the bottom only in the branding machine without lateral restraint, a pair of heated branding heads movable between a branding position and a non-branding position further apart, said heads having branding surfaces facing each other at branding position, the heads being a predetermined distance apart at branding position, means to heat the branding heads, power means moving said heads between said positions, and means for adjusting said predetermined distance to adjust the pressure between the heads and the box at branding position.

13. In a machine for branding boxes, the combination of means freely supporting a box from the bottom only in a branding machine, a pair of heated branding heads at least one of which is carried on a pivotally mounted arm and being movable through a fixed pivotal distance between a branding and a non-branding position, means to heat the branding heads, power means adapted to pivot the arm to move the head between said positions, the pivotal mounting of said arm being adjustably movable toward or away from the box to change the distance between the heads at branding position.

14. In a machine for branding the surface of a box, the combination of a pair of laterally spaced conveyor belts for carrying the box to be branded along a path, a branding member for marking a face of the box in said path and being normally positioned between the belts and below the path of the box, carrying means adapted to move the branding members from normal position into the path of the box to contact the side of the box.

15. In a machine for branding the surface of a box, the combination of a pair of horizontal laterally spaced conveyor belts adapted to carry a box to be branded along a path, a pair of branding heads for branding the forward and rear faces of the box and being normally positioned between and below said conveyor belts out of said path, a second pair of branding heads normally positioned at the outer sides of the conveyor belts, and means adapted to simultaneously move said branding heads from normal position to contact position against the sides of the box.

16. In a machine for marking indicia on the surface of a box, the combination of means providing a continuous supply of boxes, a conveyor for carrying boxes along a path through the marking machine, a first holding gate extending into the path at the rear of the conveyor, a second holding gate extending into the path at the forward end of the conveyor for holding the boxes to be marked, a set of marking arms mounted adjacent the path at the forward end of the conveyor, first means responsive to the presence of a box positioned at the forward end of the conveyor operating to move the arms to mark the box and operatively associated with the first and second holding gates moving them out of the path after a box has been marked and thereafter closing the second gate, and second means responsive to the presence of a box and being positioned between said gates, said second box responsive means being operatively connected to said first gate to close it when a box enters the branding machine.

17. In a machine for branding the surface of a box, the combination of a heated member for contacting and branding the box surface, means for moving the head between a contact and a non-contact position, means providing a continuous supply of boxes, a continually operable conveyor for transporting the box past said heated member, a first holding means for holding the carton and being releasable to permit a carton to be transported by said conveyor, a second holding means movable between holding and release positions for holding a box on the conveyor while said heated member is contacting and branding the box, operating means operably associated with said heated member and said first and second holding means, and means operatively connected to said operating means being positioned adjacent the heated member and responsive to the presence of a box to initiate operation of said operating means to move the heated member to contact position and to non-contact position and to subsequently move said first and second holding means to release position.

18. In a machine for marking boxes, the combination of a conveyor having spaced conveying elements freely supporting a box without lateral restraint and conveying it along a path, opposed box marking units normally positioned between said conveying elements and out of the path of the box, and means for moving the marking units from between the conveying units against the sides of the freely supported box and back between the elements to permit the box to be moved along the path.

19. In a machine for marking boxes, the combination of means freely supporting a box from a horizontal direction only without lateral restraint, a pair of marking heads positioned for movement against the opposing side walls of a box, a second pair of marking heads positioned for movement against the remaining opposing side walls of the box, and means to simultaneously move the two pairs of marking heads against the side walls of the box, the supported box freely adjusting its lateral position so that the pairs of the heads will engage opposing sides of the box with substantially equal pressure.

(References on following page)

References Cited in the file of this patent

UNITED STATES PATENTS

| Number | Name | Date |
|---|---|---|
| Re. 9,311 | Garretson et al. | July 20, 1880 |
| 587,562 | Stollstorff | Aug. 2, 1897 |
| 867,778 | Ames | Oct. 8, 1907 |
| 1,106,712 | James | Aug. 11, 1914 |
| 1,343,417 | Steere | June 15, 1920 |
| 1,369,934 | Onstad | Mar. 1, 1921 |
| 1,574,367 | Commander | Feb. 23, 1926 |
| 1,845,726 | Scott | Feb. 16, 1932 |
| 1,929,304 | Carpenter | Oct. 3, 1933 |
| 1,929,703 | McDonough | Oct. 10, 1933 |
| 1,938,969 | McKinnon | Dec. 12, 1933 |
| 1,940,691 | Neff et al. | Dec. 26, 1933 |
| 1,960,004 | Frantz | May 22, 1934 |
| 2,004,149 | Honigman | June 11, 1935 |
| 2,241,398 | Freeman | May 13, 1941 |
| 2,277,363 | Herbers | Mar. 24, 1942 |
| 2,320,361 | Hothersall et al. | June 1, 1943 |
| 2,341,705 | Fedorchak et al. | Feb. 15, 1944 |
| 2,364,345 | Cooper | Dec. 5, 1944 |
| 2,409,397 | Sheehan et al. | Oct. 15, 1946 |
| 2,549,341 | Sperling | Apr. 17, 1951 |
| 2,567,232 | Nordquist et al. | Sept. 11, 1951 |
| 2,571,528 | Braccio | Oct. 16, 1951 |
| 2,620,727 | Packer et al. | Dec. 9, 1952 |
| 2,631,528 | Wood | Mar. 17, 1953 |
| 2,646,746 | Muller | July 28, 1953 |